US006244303B1

United States Patent
Adams

(10) Patent No.: US 6,244,303 B1
(45) Date of Patent: Jun. 12, 2001

(54) HELICALLY WOUND FLEXIBLE HOSE

(75) Inventor: Anthony Dennis Adams, Fairlawn, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/489,350

(22) Filed: Jan. 21, 2000

(51) Int. Cl.$^7$ ..................................... F16L 11/08
(52) U.S. Cl. ................. 138/129; 138/132; 138/174; 138/122
(58) Field of Search ................... 138/129, 122, 138/132, 144, 150, 154, 174, 173, 153

(56) References Cited

U.S. PATENT DOCUMENTS

| Re. 24,468 | 5/1958 | Roberts | 136/56 |
|---|---|---|---|
| 1,179,575 | 4/1916 | Sundh . | |
| 2,516,864 | 8/1950 | Gilmore et al. | 154/8 |
| 3,207,827 | 9/1965 | Kuehnle | 264/174 |
| 3,885,594 | 5/1975 | Tanaka | 138/129 |
| 4,130,535 | 12/1978 | Coran et al. | 260/33.6 |
| 4,587,145 | 5/1986 | Kanao | 428/36 |
| 4,613,389 | 9/1986 | Tanaka | 156/143 |
| 5,358,580 | 10/1994 | Miyamura et al. | 156/143 |

FOREIGN PATENT DOCUMENTS

| 1 407 974 | 8/1971 | (GB) | F16L/11/08 |
|---|---|---|---|
| 43-17816 | 7/1943 | (JP) . | |

Primary Examiner—Patrick Brinson
(74) Attorney, Agent, or Firm—Nancy T Krawczyk

(57) ABSTRACT

A flexible hose 10 having a flexible material 12 and a more rigid material 14. The flexible material 12 and the more rigid material 14 being helically wound and molded together to form a hose 10 with an exterior surface 16 and an interior surface 18. The cross-section of the more rigid material 14 having at least two peninsulas 20, extending in longitudinally opposite directions, at least one radially inwardly extending peninsula 22, and at least one radially outwardly extending peninsula 22. The longitudinally extending peninsulas 20 are embedded in the flexible material 12 and the radially extending peninsulas 22, 24 are at least partially embedded in the flexible material 12. In the preferred embodiment, the longitudinally extending peninsulas 20 are centrally located in the flexible material 12 between the respective surfaces 16, 18 of the hose 10 and the radially outwardly extending peninsula 24 extends beyond the flexible material 12 on the exterior surface 16 of the hose 10.

5 Claims, 5 Drawing Sheets

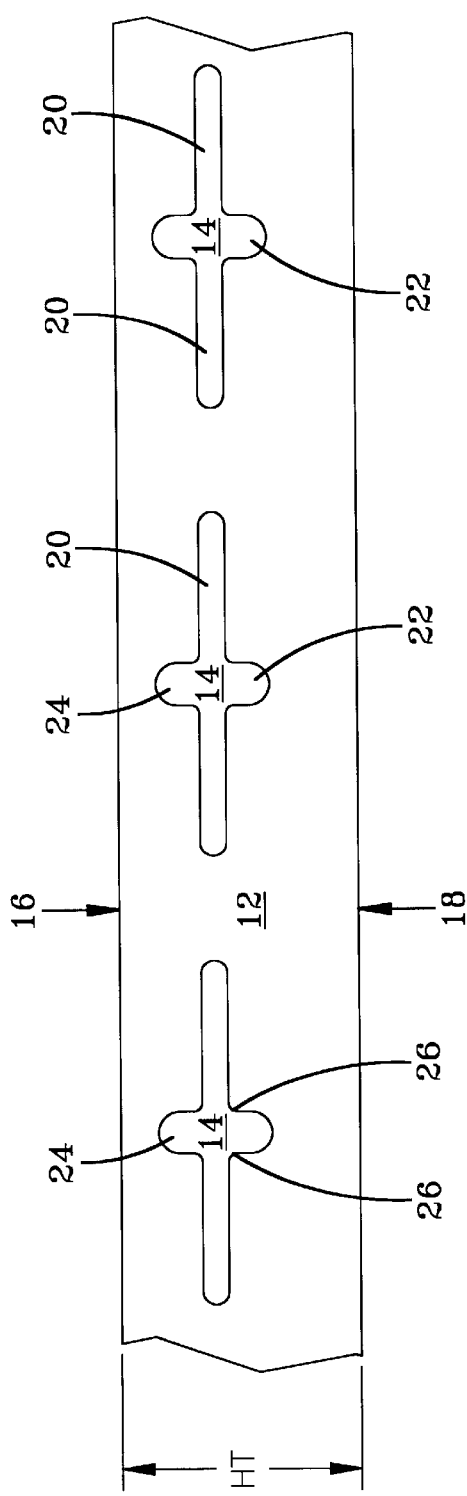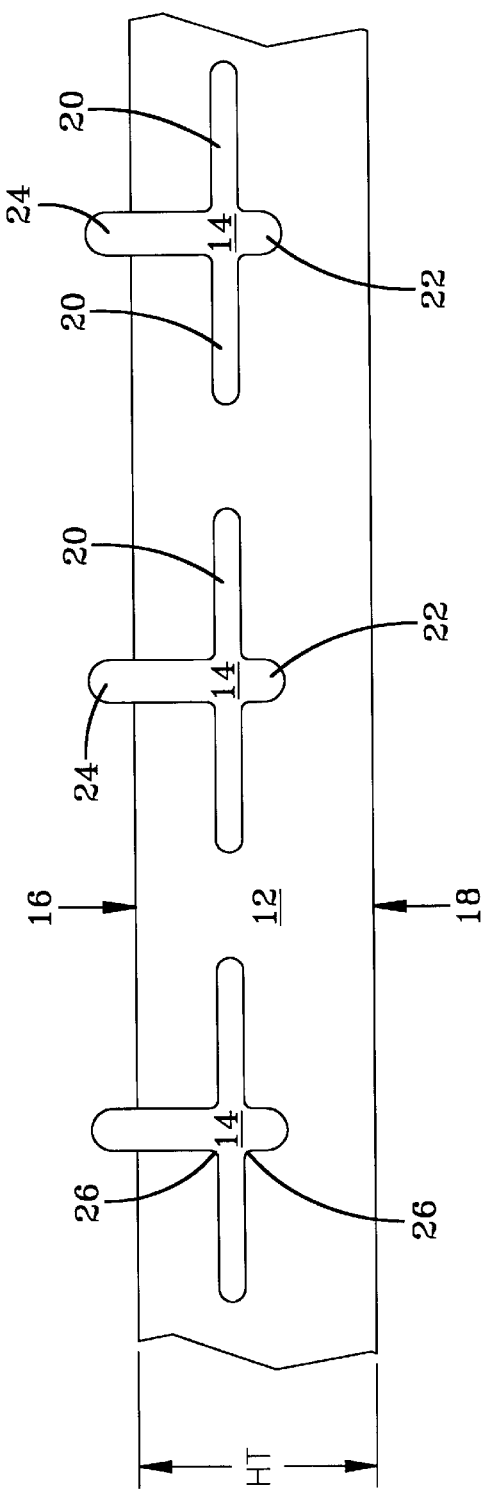

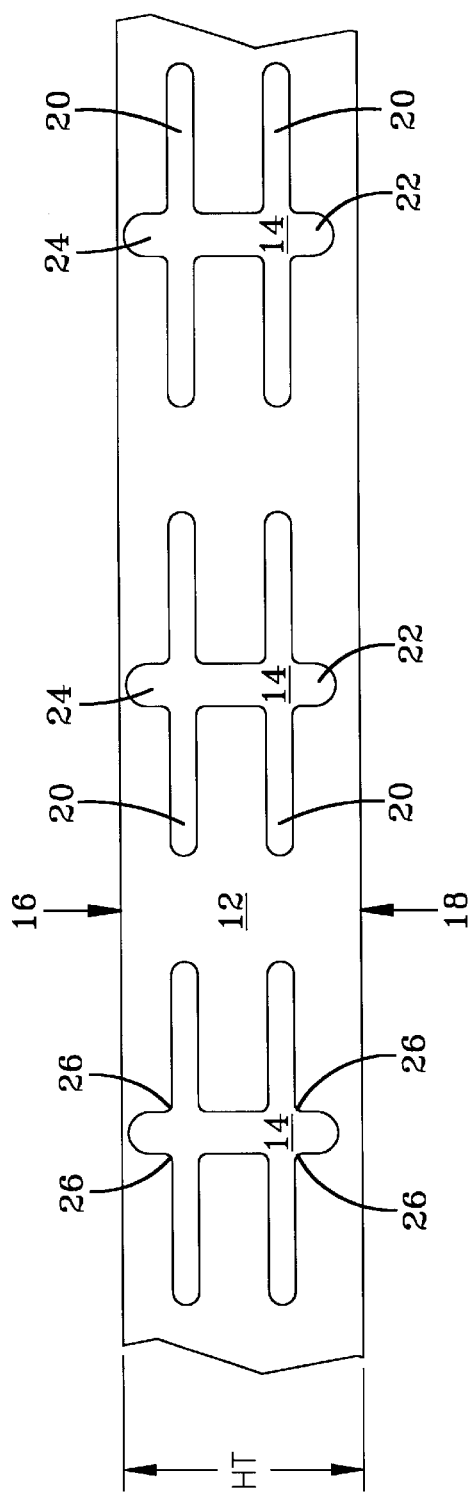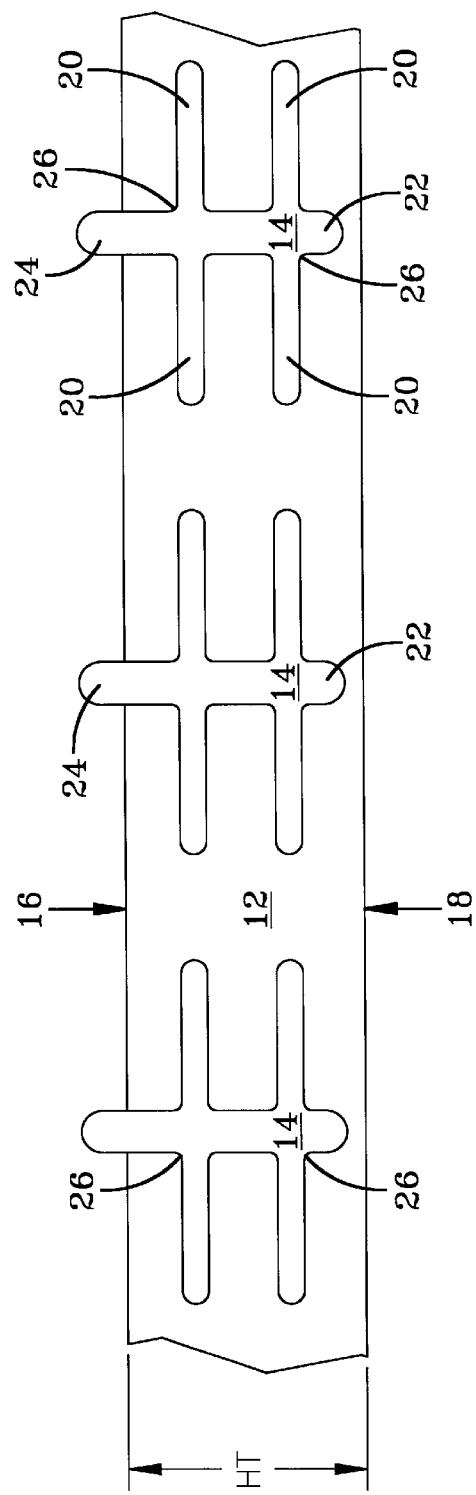

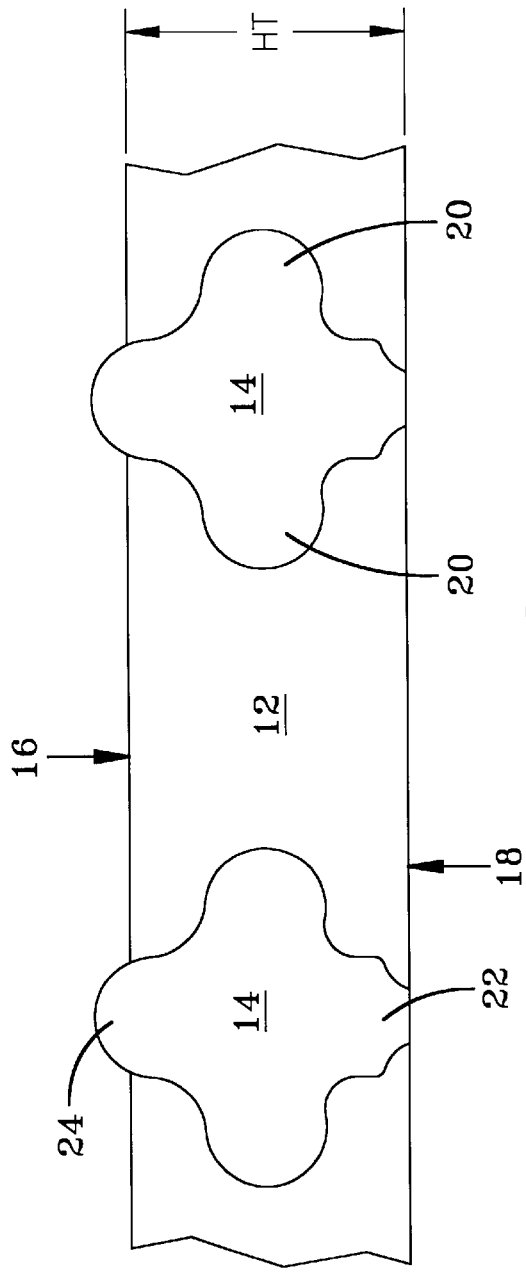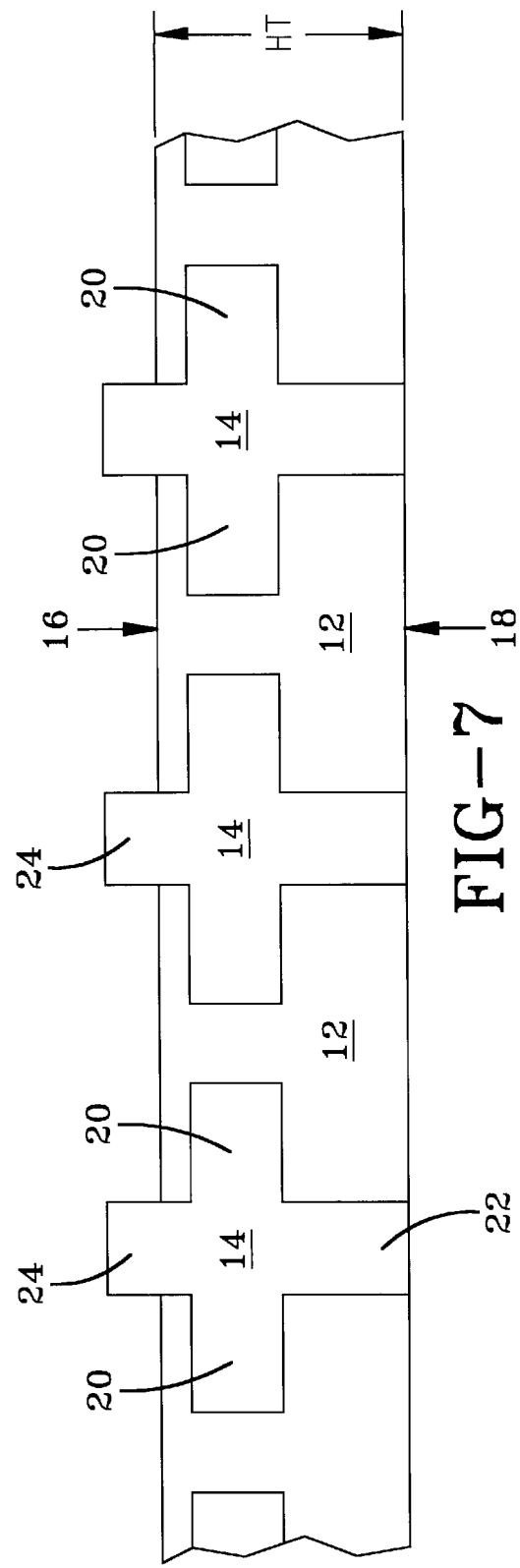

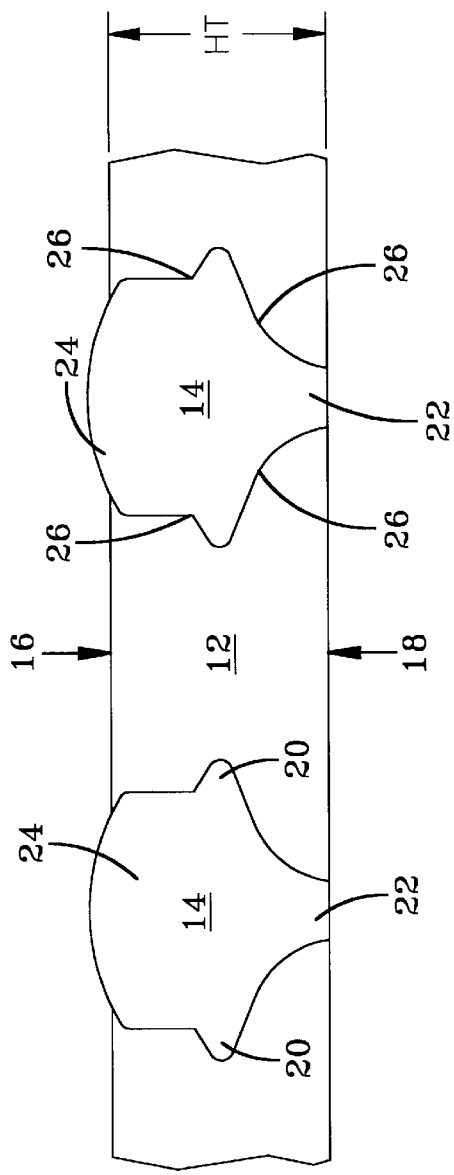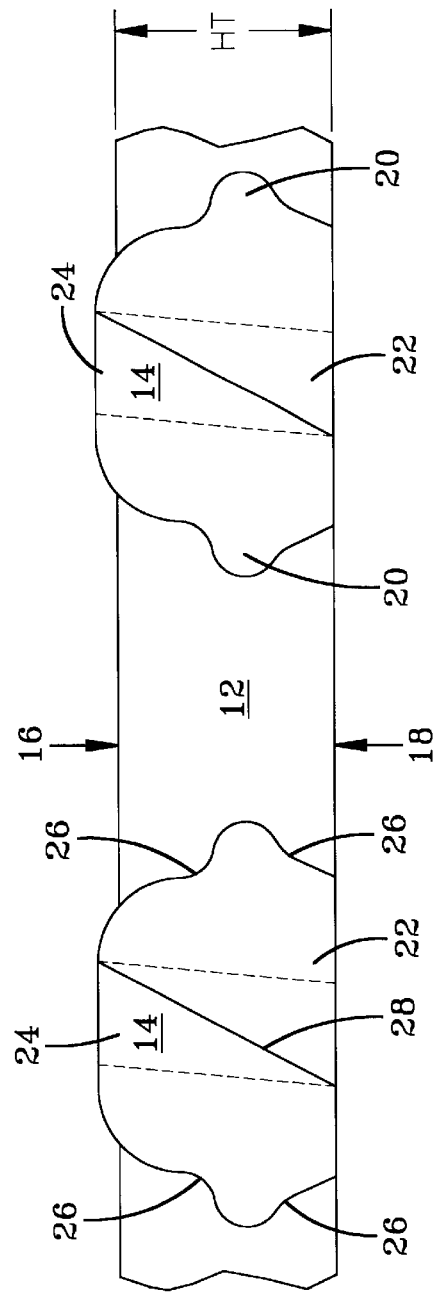

HELICALLY WOUND FLEXIBLE HOSE

TECHNICAL FIELD

This invention relates to a flexible hose and, more particularly, to a helically wound flexible hose comprised of a flexible material and a material more rigid than the flexible material.

BACKGROUND ART

Helically wound flexible hoses are commonly used to convey fluids. These hoses must be flexible enough to allow nobility during use, yet durable enough to withstand the normal abuses associated with their environment, such as being dragged upon a surface such as a floor, being stepped upon, etc. These flexible hoses can be subjected to both pressure and vacuum and must be able to sustain both of these forces.

Flexible hoses are often used to convey liquid chemicals. In liquid chemical applications, the hose must be able to withstand the pressure or vacuum of the application, the environment, and additionally must be chemically resistant. Prior art hoses built for chemical applications are formed of a flexible material, or web, and a more rigid material that are helically wound in an interlocking manner to form a tubular channel. The more rigid material has a circular or oval cross-section and typically, a portion of the cross-section extends radially outwardly beyond the flexible material on the exterior surface of the hose. This radially outwardly extending portion of the cross-section of the more rigid material helps to prevent damage to the flexible material, such as that caused by friction from the hose being dragged across a surface.

Problems with the prior art hoses arose when customers began demanding hoses having a greater chemical resistance and an ability to withstand higher pressures. Some materials that provide excellent chemical resistance have low strengths and, in the prior art configuration are unable to withstand the pressures demanded by the customers. Additionally, these hoses are susceptible to failure if the surface of the flexible material becomes damaged because the more rigid material, with a circular or oval cross-section, concentrates the stress or strain caused from bending the hose on the exterior surface of the flexible material. Consequently, when the prior art hose is subject to bending stresses and the high pressure application, the flexible material may peel away from the more rigid material and cause the hose to fail.

U.S. Pat. No. 3,885,594 discloses a reinforced flexible pipe having a tubular wall formed of a soft synthetic material and a reinforcing spiral core of a hard synthetic resin material. The reinforced spiral core is substantially I-shaped and is partly exposed out of the pipe wall.

U.S. Pat. No. 4,120,628 discloses an apparatus for extruding a plastic tube having a spiral or helical tape or filament forming a reinforced skeleton of the tube. The spiral or helical tape or filament has a substantially S-shaped or a round cross-section.

U.S. Pat. No. 4,587,145 discloses a flexible hose comprising soft and hard members alternately disposed in a spiral form. The hose further has a connector element disposed through the center of the thickness of the soft member. The connector element comprises projected portions that are interconnected to the hard member. The connector element further comprises a string member on which projected portions are sewed.

SUMMARY OF THE INVENTION

The flexible hose of the invention is comprised of a flexible material and a material more rigid than the flexible material. The flexible material and the more rigid material are helically wound and molded together to form a hose with an exterior surface and an interior surface.

The cross-section of the more rigid material has at least two peninsulas, extending in longitudinally opposite directions, at least one radially inwardly extending peninsula, and at least one radially outwardly extending peninsula. The longitudinally extending peninsulas are embedded in the flexible material and the radially extending peninsulas are at least partially embedded in the flexible material.

DEFINITIONS

For ease of understanding this disclosure, the following terms are defined.

"Longitudinal" or "longitudinally" are used to mean directions along the length of the hose.

"Peninsula" or "peninsulas" are used to mean one or more protrusions from a central area of the cross-section of the more rigid material. Each protrusion is surrounded on at least three sides by either the flexible material, the hose interior, the atmosphere or any combination of these items. A side of each peninsula can be smooth, curved, or contoured. The central area of the cross-section of the more rigid material may vary in size from merely an intersection of multiple peninsulas to a larger body of the more rigid material.

"Radial" or "radially" are used to mean directions toward or away from the central axis of the hose.

BRIEF DESCRIPTION OF DRAWINGS

The invention will be described by way of example and with reference to the accompanying drawings in which:

FIG. 2 is a cross-sectional view of the wall of a second embodiment of the flexible hose;

FIG. 3 is a cross-sectional view of the wall of a third embodiment of the flexible hose;

FIG. 4 is a cross-sectional view of the wall of a fourth embodiment of the flexible hose;

FIG. 5 is a cross-sectional view of the wall of a fifth embodiment of the flexible hose;

FIG. 6 is a cross-sectional view of the wall of a sixth embodiment of the flexible hose;

FIG. 7 is a cross-sectional view of the wall of a seventh embodiment of the flexible hose;

FIG. 8 is a cross-sectional view of the wall of a eighth embodiment of the flexible hose;

FIG. 9 is a cross-sectional view of the wall of the preferred embodiment of the flexible hose.

DETAILED DESCRIPTION OF THE INVENTION

Figure 1:
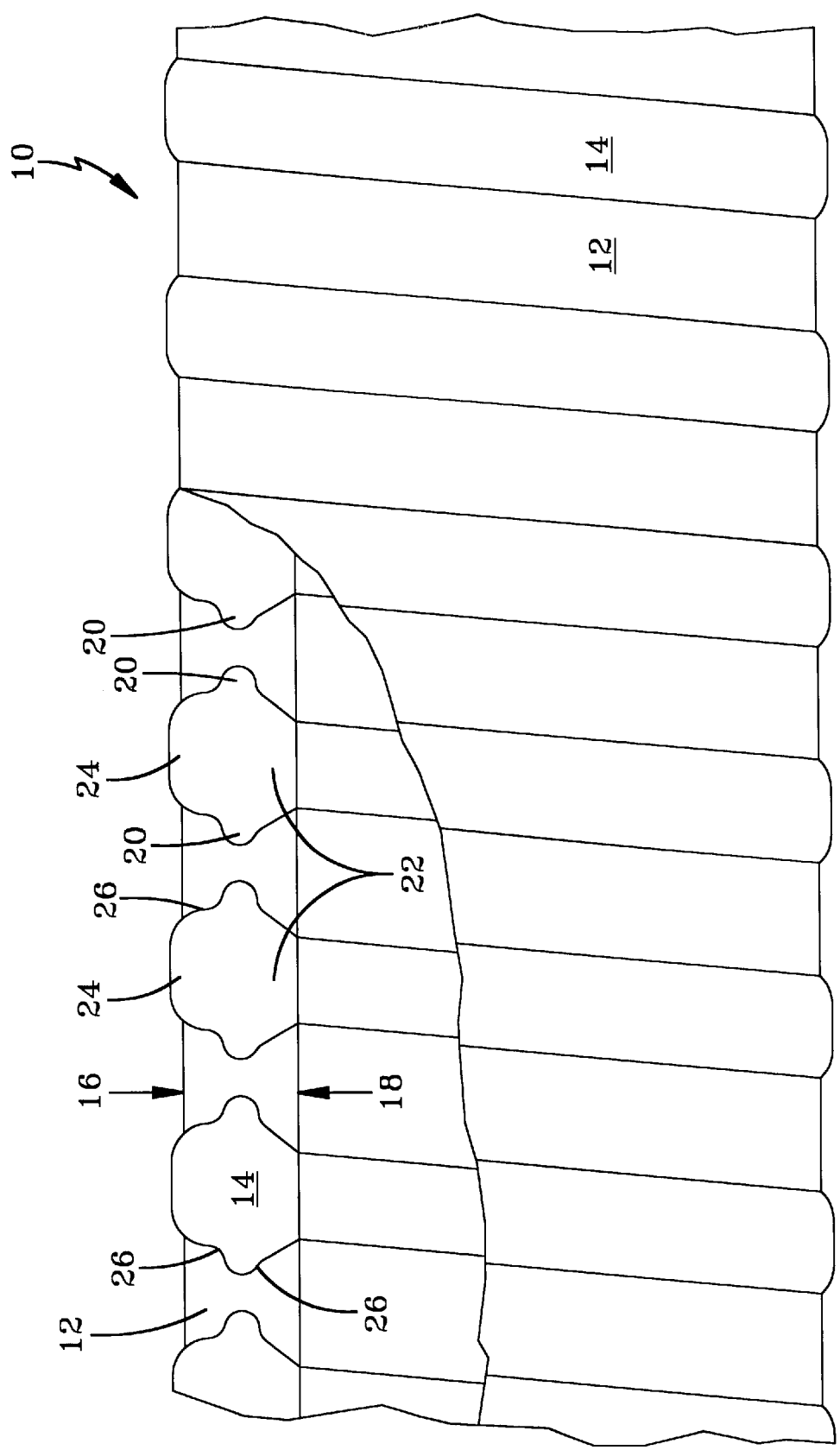
FIG. 1 is a view of the flexible hose of the invention with a partial cut-away displaying the structure of the wall of the hose.

FIG. 1 shows an embodiment of the flexible hose 10 of the invention with a partial cut-away displaying the wall of the hose 10. The wall of the hose 10 is formed from a flexible material 12 and a material 14 more rigid than the flexible material 12. As shown, the flexible material 12 and the more rigid material 14 are helically wound and molded together to form the hose 10. The hose 10 has an exterior surface 16 and an interior surface 18. The interior surface 18 forms the tubular channel of the hose 10 and may be contoured, textured, or smooth. Ideally, the interior surface 18 of the hose 10 is smooth. The exterior surface 16 of the hose 10, as depicted in FIG. 1, is contoured with the more rigid material 14 extending radially outwardly beyond the flexible material 12 on the exterior surface 16 of the hose 10. The portion of the more rigid material 14 extending radially beyond the flexible material 12 provides a resistant surface that prevents wear to the flexible material 12 of the hose 10. By extending radially beyond the flexible material 12, the more rigid material 14 absorbs the friction when the hose 10 is dragged on a floor or over other surfaces. This increases the wear resistance of the hose 10 by focusing the wear on the more rigid material 14. In addition to providing increased wear resistance, the more rigid material 14 also helps to prevent the hose 10 from collapsing should a moderate load be placed upon it. Thus, if a person steps on the hose 10, the more rigid material 14 may be sufficiently strong to support the weight of the person such that the hose 10 will not collapse and cut-off the flow of the fluid being transported.

The major advantage achieved by the hose 10 of the invention is its ability to withstand higher stress or strain loads prior to failure. The cross-sectional shape of the more rigid material 14 is the key to the hose's ability to withstand these greater loads. The cross-section of the more rigid material 14 has at least two peninsulas 20 that extend in longitudinally opposite directions. Each longitudinally extending peninsula 20 is completely embedded in the flexible material 12 between the interior surface 18 and the exterior surface 16 of the hose 10. The hose 10 also has a radially inwardly extending peninsula 22 and a outwardly extending peninsula 24. Each radially extending peninsula 22, 24 is at least partially embedded in the flexible material 12.

One result of this cross-sectional shape of the more rigid material 14 is an increase in the surface area of contact between the more rigid material 14 and the flexible material 12, as compared to the prior art. Since the surface area of contact is increased, there is a greater dissipation of the stress or strain. This greater dissipation of the stress or strain allows the hose 10 to withstand higher stress or strain loads prior to failing. A second result of this cross-sectional shape is that the stress or strain caused by bending the hose 10 is concentrated in the area between the longitudinally extending peninsulas 20 of adjacent windings of the more rigid material 14. By concentrating the stress or strain deeper into the wall of the hose 10, the likelihood of failure due to damage on the exterior surface 16 is lowered. In the prior art hose, the stress or strain is concentrated on the exterior surface 16; thus, a small amount of damage in the area of concentrated stress or strain was likely to cause a failure of the hose. A third result of the cross-sectional shape of the more rigid material 14 is a direct result of the radial and longitudinal peninsulas 20, 22, 24. The peninsulas 20, 22, 24 give the more rigid material 14 a non-convex shape and create pockets 26 between the radial and longitudinal peninsulas. As the hose 10 is bent, the flexible material 12 that is under compression is forced into the pockets 26. The pockets 26 hold the flexible material 12 in place and do not allow it to be peeled off the more rigid material 14.

FIG. 2 shows a cross-sectional view of the wall of a second embodiment of the flexible hose 10. The longitudinally extending peninsulas 20 are completely embedded in the flexible material 12 but are located nearer the exterior surface 16 of the hose 10 than the interior surface 18. If the hose 10 has an average thickness HT from the interior surface 18 to the exterior surface 16, then the longitudinally extending peninsulas 20 are located at least 10% of the thickness HT below the respective surface 16, 18 of the hose. FIG. 2 also shows the radially inwardly extending peninsula 22 and the outwardly extending peninsula 24 completely embedded in the flexible material.

FIG. 3 shows a cross-sectional view of the wall of a third embodiment of the flexible hose 10. The embodiment of FIG. 3 is similar to that of FIG. 2; however, the radially outwardly extending peninsula 24 extends beyond the flexible material 12 on the external surface 16 of the hose 10. This extension beyond the flexible material 12 increases the wear resistance of the hose 10 by allowing the more rigid material 14 of the hose 10 to absorb most of the friction causes by dragging the hose on the floor or other surfaces.

FIGS. 4 and 5 show cross-sectional views of the wall of additional embodiments of the flexible hose 10. In FIG. 4, the cross-section of the more rigid material 14 has four longitudinally extending peninsulas 20. Each longitudinally extending peninsula 20 extends in an opposite direction from a corresponding longitudinally extending peninsula 20. Again, each of the longitudinally extending peninsulas 20 is embedded in the flexible material 12 and is located at least 10% of the average thickness HT of the wall from the respective surfaces 16, 18. FIG. 5 shows a cross-section of the more rigid material 14 that is similar to that in FIG. 4; however, in FIG. 5, the radially outwardly extending peninsula 24 extends beyond the flexible material 12 on the exterior surface 16 of the hose 10.

FIG. 6 shows the cross-section of the wall of another embodiment of the hose 10. The more rigid material 14 is molded to the flexible material 12 such that each longitudinally extending peninsula 20 is centrally located between the interior surface 18 and the exterior surface 16. By centering each longitudinally extending peninsula 20, the stress or strain is concentrated at the furthest position possible from a respective surface 16, 18 of the hose 10.

FIG. 7 shows the cross-section of the wall of a seventh embodiment of the hose 10. The cross-section of the more rigid material 14 in this embodiment is cross-shaped. The respective windings of the more rigid material 14 in FIG. 7 are much closer together than those shown in FIG. 6. The distance between adjacent windings of the more rigid material 14 can be varied depending upon the required flexibility of the hose 10. If the windings of the more rigid material 14 are close together, as shown in FIG. 7, the hose 10 will be less flexible than if the windings of the more rigid material 14 are separated by a longer portion of flexible material 12, as shown in FIG. 6

FIG. 8 shows a cross-sectional view of the wall of an eighth embodiment of the flexible hose 10. In this embodiment, the more rigid material 14 near the exterior surface 16 is wider than it is near the interior surface 18. This embodiment allows for increased flexibility of the hose 10 with a given amount of the more rigid material 14 extending beyond the exterior surface 16 of the flexible material 12. The large external surface area of the more rigid material 14 gives the hose 10 increased wear resistance.

FIG. 9 shows a cross-sectional view of the preferred embodiment of the flexible hose 10. In the preferred embodiment, the more rigid material 14 has a width greater than its height. The primary purpose for the greater width of the more rigid material 14 is the cross-sectional shape of the more rigid material 14 is very difficult to extrude. As such, the more rigid material 14 is extruded in two sections that become molded together at a mold line 28. Ideally, the exterior surface 16 of the hose 10 will consist of between 25% to 50% of the more rigid material 14 and between 50% to 75% of the flexible material 12. This allows the hose 10 to remain flexible while having a durable exterior surface 16. In the preferred embodiment, between 10% to 25% of the radially outwardly extending peninsula 24 extends beyond of the flexible material 12. In the preferred embodiment, the hose 10 has only two longitudinally extending peninsulas 20 and each is centrally located between the respective surfaces 16, 18 of the hose 10. By centralizing the longitudinally extending peninsulas 20, the stress or strain is centralized in the wall of the hose 10 and away from the surfaces 16, 18. Although each of the depicted embodiments shows the more rigid material being symmetrical, the cross-sectional shape can be asymmetrical.

To manufacture this hose, the more rigid material 14 and the flexible material 12 are simultaneously extruded. The extruded more rigid material 14 and flexible material 12 are then brought together such that they mold together in an interlocking manner. The more rigid material 14 and the flexible material 12 are then helically wound to form the hose 10. In the preferred embodiment, one half of the more rigid material 14 is extruded on each side of the flexible material 12. The combination is then helically wound such that the two halves of the more rigid material 14 mold together at the mold line 28.

This invention strengthens a hose 10 made from a weaker, more chemically resistant, flexible material 12. The invention increases the area of contact between the more rigid material 14 and the flexible material 12. This greater area of contact dissipates the stress or strain when the hose 10 is bent a given amount. The invention also concentrates the stress or strain into the central portion of the flexible material 12 and away from the surfaces 16, 18. Thus, damage to the exterior surface 16 of the flexible material 12 is less likely to cause a failure of the hose 10.

In the preferred embodiment, the more rigid material 14 of the flexible hose 10 is made from polypropylene. The flexible material 12 is a thermoplastic elastomer. Such thermoplastic elastomers are sold by Advanced Elastomer Systems under the tradename Santoprene, by DuPont under the tradename Hytrel, and by Shell under the tradename Kraten. A preferred thermoplastic elastomer for use in this invention is a dynamically vulcanized blend of polypropylene with EPDM (ethylene-propylene-diene monomer) rubber. Such a thermoplastic elastomer is disclosed in U.S. Pat. No. 4,130,535, the teachings of which are incorporated herein by reference in their entirety.

The increased strength of the hose 10 has been proven by a series of burst tests on hoses having a 50 psi working pressure. The prior art hose, having a more rigid material with a circular cross-section made of polypropylene and a flexible material made of Santoprene, had an actual burst pressure ranging from 98 psi to 127 psi. The hose of the invention, having a more rigid material made of polypropylene in a cross-sectional shape of the preferred embodiment of FIG. 9 and a flexible material made of Santoprene, had an actual burst pressure ranging from 153 psi to 170 psi.

What is claimed is:

1. A flexible hose (10) comprising a flexible material (12) and a material (14) more rigid than the flexible material (12), the more rigid material (14) and the flexible material (12) being helically wound and molded together to form a hose (10) with an exterior surface (16) and an interior surface (18), the hose (10) being characterized by:

the cross-section of the more rigid material (14) having at least two peninsulas (20), extending in longitudinally opposite directions, at least one radially inwardly extending peninsula (22), and at least one radially outwardly extending peninsula (24), the longitudinally extending peninsulas (20) being embedded in the flexible material (12) and the radially extending peninsulas (22, 24) being at least partially embedded in the flexible material (12).

2. A flexible hose (10) as in claim 1, the hose (10) being further characterized by:

the flexible material (12) having an average thickness HT measured from the interior surface (18) of the hose (10) to the exterior surface (16) of the hose (10), the longitudinally extending peninsulas (20) being embedded in the flexible material (12) at least 10% of the thickness HT of the flexible material (12) below each surface (16, 18) of the hose (10).

3. A flexible hose (10) as in claim 1, the hose (10) being further characterized by:

the radially outwardly extending peninsula (24) extending radially beyond the flexible material (12) on the external surface (16) of the hose (10).

4. A flexible hose (10) as in claim 1, the hose (10) being further characterized by:

each longitudinally extending peninsula (20) being centrally located in the flexible material (12) between the interior surface (18) and the exterior surface (16) of the hose (10).

5. A flexible hose (10) as in claim 1, the hose (10) being further characterized by:

the radially inwardly extending peninsula (22) extending to form a portion of the interior surface (18) of the hose (10).

* * * * *